Sept. 11, 1956         G. B. ENTZ         2,762,359

STONE CUTTING MACHINE

Filed Nov. 9, 1954         6 Sheets-Sheet 1

INVENTOR.

Gerhard B. Entz

BY

ATTORNEYS.

Sept. 11, 1956　　　　　G. B. ENTZ　　　　　2,762,359
STONE CUTTING MACHINE
Filed Nov. 9, 1954　　　　　　　　　　　　　　　6 Sheets-Sheet 2

INVENTOR
Gerhard B. Entz
BY Lancaster, Allwine & Rommel
ATTORNEYS

Sept. 11, 1956
G. B. ENTZ
2,762,359
STONE CUTTING MACHINE
Filed Nov. 9, 1954
6 Sheets-Sheet 3
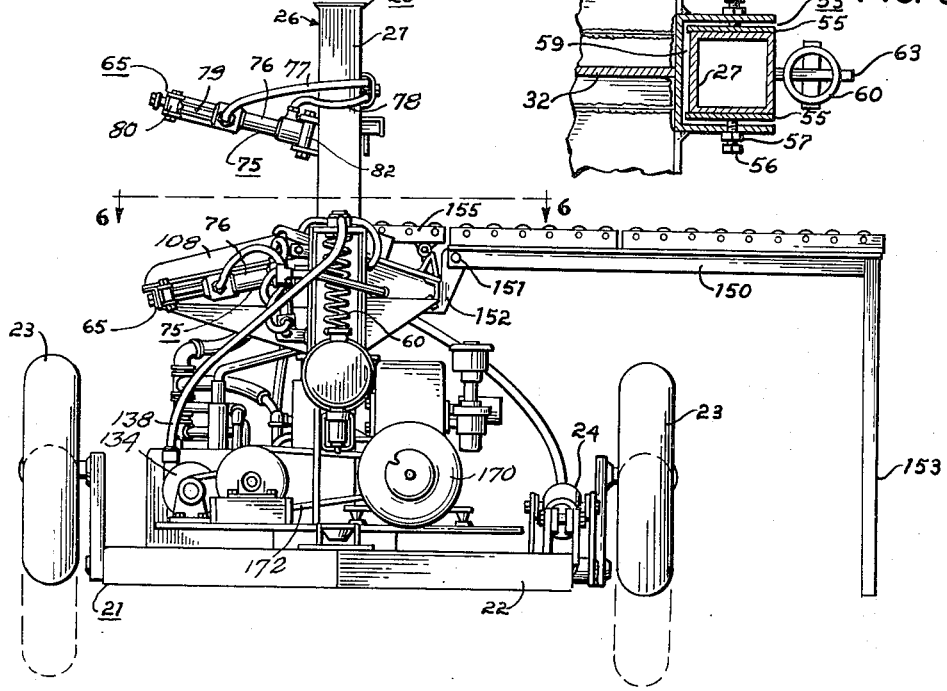
FIG. 4
FIG. 9
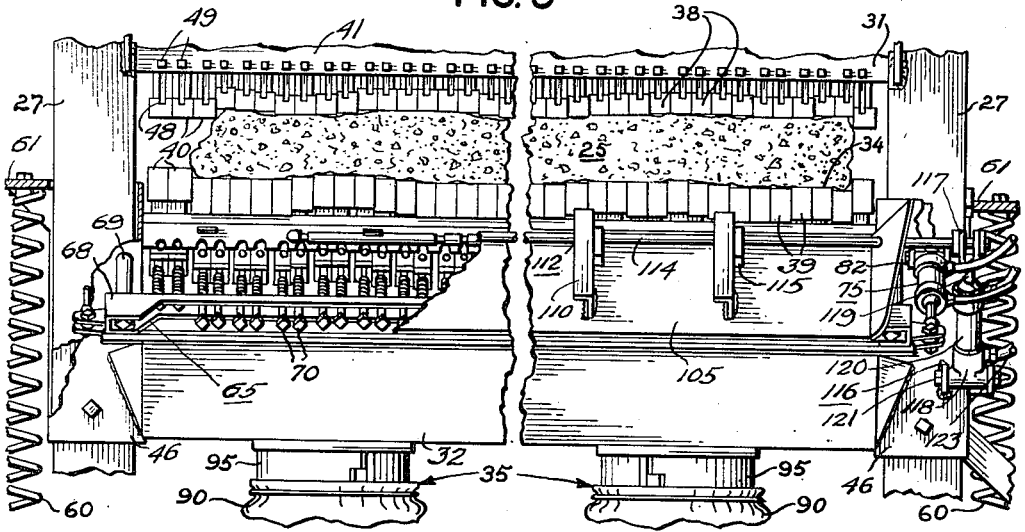
FIG. 5
INVENTOR
Gerhard B. Entz
BY *Lancaster, Allwine and Rommel*
ATTORNEYS INVENTOR
Gerhard B. Entz

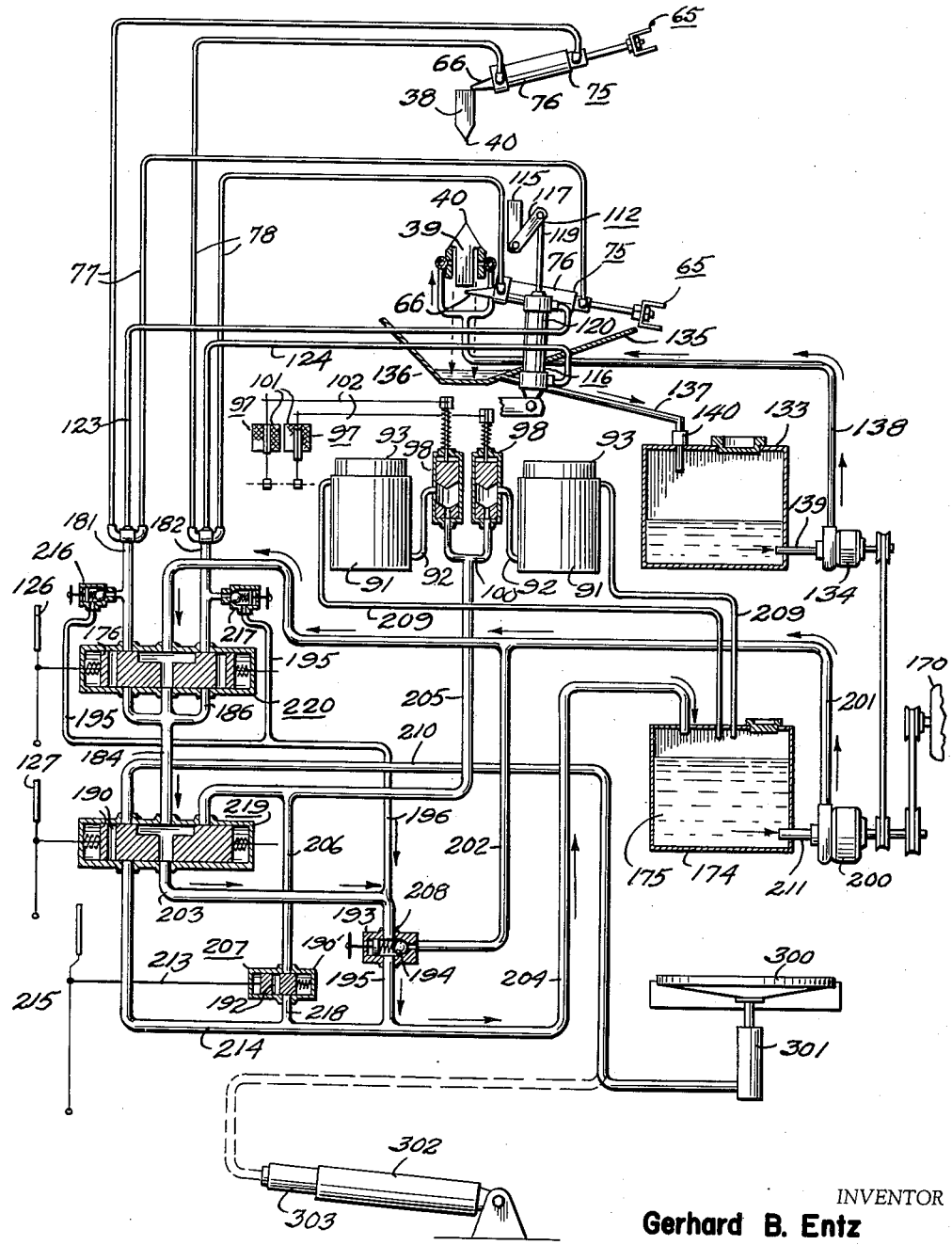

Sept. 11, 1956 G. B. ENTZ 2,762,359
STONE CUTTING MACHINE
Filed Nov. 9, 1954 6 Sheets-Sheet 6

INVENTOR
Gerhard B. Entz

BY *Lancaster, Allwine & Rommel*
ATTORNEYS though the machines are operated by somewhat careless
United States Patent Office 2,762,359
Patented Sept. 11, 1956

2,762,359
STONE CUTTING MACHINE
Gerhard B. Entz, Oklahoma City, Okla.

Application November 9, 1954, Serial No. 467,699

14 Claims. (Cl. 125—23)

This invention relates to stone cutting machines of the general class shown in Patent 2,152,193 issued to P. M. Johanning March 28, 1939, and assigned to me.

The principal objects of the present invention are to provide machines for cutting or breaking stratified stone or artificial stone slabs of various thicknesses and shapes into smaller units of various shapes for use in walls, fireplaces and other building constructions, etc., which may be economically operated and which have parts constructed and arranged to guard against twisting or breaking of the machine frames and parts carried thereby, even or inexperienced operators.

Another object is to provide machines of this character which may each have primary controls, for various cycles of operations, so located that one man situated at a single station may operate the machine, while another workman is employed to move the slabs into proper relation with respect to the jaws of the machine, the primary controls being preferably associated with a number of servo-motors operatively connected with movable parts of the machine, some of which operate simultaneously, and some in sequence.

In the preferred embodiment of the present invention, the upper jaw of the machine is stationary, and the lower jaw is movable toward and from the upper jaw, which is the reverse from that which is shown in the Johanning Patent 2,152,193.

In practice it has been found that, during certain periods of operation of stone cutting machines, the stone, delivered from the quarry, is relatively thick and large, and is cut into relatively long strips for use in building walls, by way of example; and at other periods, the stone delivered is relatively thin and is cut into relatively small rectangular pieces, by way of example, for use in providing floors or as wall inlays. Also, during either of such periods of operation, the stone from the quarry may be of the desired thickness but of very irregular shape and initially it is desirable to trim off slender projecting portions, so as to "square" the pieces, and not deliver strips to the customer, the ends of which are not substantially normal to the longitudinal margins. Furthermore, at times the piece of stone delivered for cutting by the machine is so large that it cannot be passed through the machine without first cutting off some corners or odd shaped projecting portions. Thus the machine may be subjected to unnecessary wear and tear if for this smaller work, the movable cutting blade is always activated by a single jack as proposed in the past or always actuated by two simultaneously operating jacks as proposed in the past. Another object of the present invention is to provide a control whereby any one of a plurality of jacks may be actuated to the exclusion of another or others or they may be activated simultaneously.

Another object of the invention is to provide a stone cutting machine in which upper and lower cutting members, such as chisels, adapted to engage upper and lower faces of the stone to be cut along a predetermined line of fracture, may be adjusted one with respect to the other for accuracy and clean cutting and thereby avoid excessive waste which may otherwise occur as a result of the stone being fractured at unwanted zones, and to avoid subjecting the machines to abnormal stresses and strains which may otherwise occur if these cutting members are out of alignment.

Another object is to provide a stone cutting machine having upper and lower jaws, the lower jaw, at least, comprising a plurality of vertically movable chisels which may be primarily set and held against the underside of the stone, to be subsequently cut by relative movement of the jaws toward one another, and to provide for lubrication of the shanks of said chisels and to wash away therefrom foreign matter, such as dirt, gravel, chips of stone, etc., by gravity flow of a lubricating-wash liquid, such as kerosene or similar light oil, and in a manner to guard against staining the stone being cut.

Another object is to provide a stone cutting machine in which movable stop means is provided to arrest movement of the stone to be cut after it has been moved to a position between jaws of the machine for the desired cut, and in which actuating means for movable chisels, carried by at least one of the jaws, is provided to set them in contact with a face of the stone, according to its contour, both said stop means and chisel actuating means being operated simultaneously in a manner that the stop means is out of the way of the stone, when the chisels are set for the cutting of the stone, and vice versa.

Other objects and advantages of the invention will appear in the following detailed description of a highly successful machine, constructed according to the present invention, taken in connection with the accompanying drawings, forming a part of this specification, and in which drawings:

Fig. 4 is a side elevational view showing a roller slideway or conveyor for the work set up, leading to the rear of the machine.

Fig. 5 is an enlarged fragmentary view, of the machine at the zone where the jaws act upon the stone slab, shown in vertical section, parts of the machine being broken away to disclose preferred details.

Fig. 9 is an enlarged horizontal sectional view on the line 9—9 of Fig. 1.

Fig. 13 is a schematic fluid flow diagram, showing various control valves and parts of mechanisms to disclose the preferred construction and operation of the machine, this figure showing the control all in neutral position.

Figure 1:
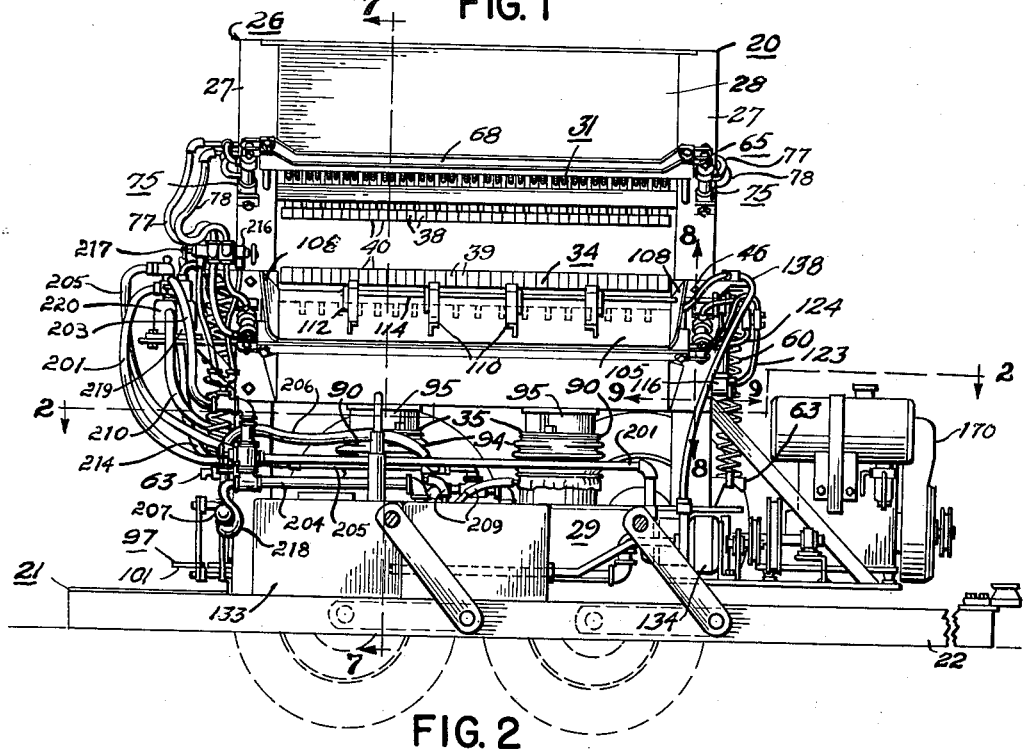
Fig. 1 is a front elevational view of the machine mounted on a trailer with the wheels elevated, so that the frame of the trailer rests on the ground, the dotted lines showing the riding positions of the trailer wheels.

In the drawings the stone cutting machine, designated generally by reference character 20, is disclosed mounted upon a trailer 21, including a frame 22, ground wheels 23 and means 24 for raising and lowering the frame 22 with respect to the ground wheels, whereby the stone cutting machine may be readily moved from place to place while in a raised position, and lowered so that the frame 22 rests upon the ground or other suitable surface while in operation. The trailer is more fully disclosed and claimed in my copending application filed November 2, 1953, Serial No. 389,753. A typical stone 25 is shown in Fig. 5 being acted upon by the machine.

The stone cutting machine, in the example shown, includes an upright frame 26 comprising spaced, parallel posts 27 and upper and lower elongated, reaction cross members 28 and 29, rigidly connected with the upper and lower portions, respectively, of the posts 27; a cutting means 31 carried by and disposed longitudinally of and below the upper cross member 28 for engagement upon the upper surface of the stone 25 to be cut along a predetermined line of fracture; an intermediate, vertically movable, elongated cross member 32 disposed with its end portions guided along the frame posts 27 and movable toward and from the cross members 28 and 29; a cutting means 34 disposed longitudinally of and above the intermediate cross member 32 for engagement with the under surface of the stone 25 to be cut; and means 35 cooperating with the lower reaction cross member 29 for actuating the intermediate cross member 32. Thus it may be observed that, in effect, the upper cross member 28 and the cutting means 31 constitutes an upper jaw, and the intermediate cross member 32 and the cutting means 34 constitutes a lower jaw of the machine.

It is preferred to construct and arrange the cutting means 31 and 34 in an manner broadly similar to the arrangements shown in the Johanning Patent 2,152,193 in that they include a plurality of independently movable chisels 38 and 39, respectively, providing cutting edges 40 extending longitudinally of their associated cross members 28 and 32, respectively.

Figures 6, 8:
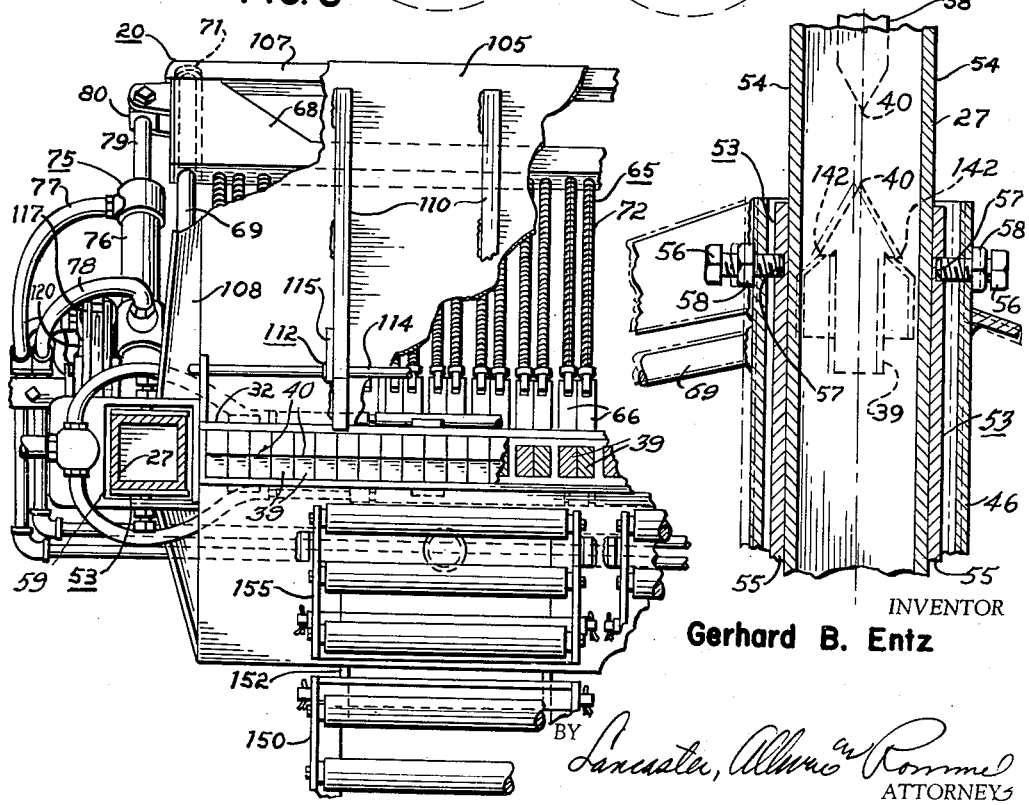
Fig. 6 is an enlarged fragmentary horizontal sectional view on substantially the line 6—6 of Fig. 4.
Fig. 8 is a greatly enlarged vertical sectional view on substantially the line 8—8 of Fig. 1.
Figures 7, 10, 11, 12:
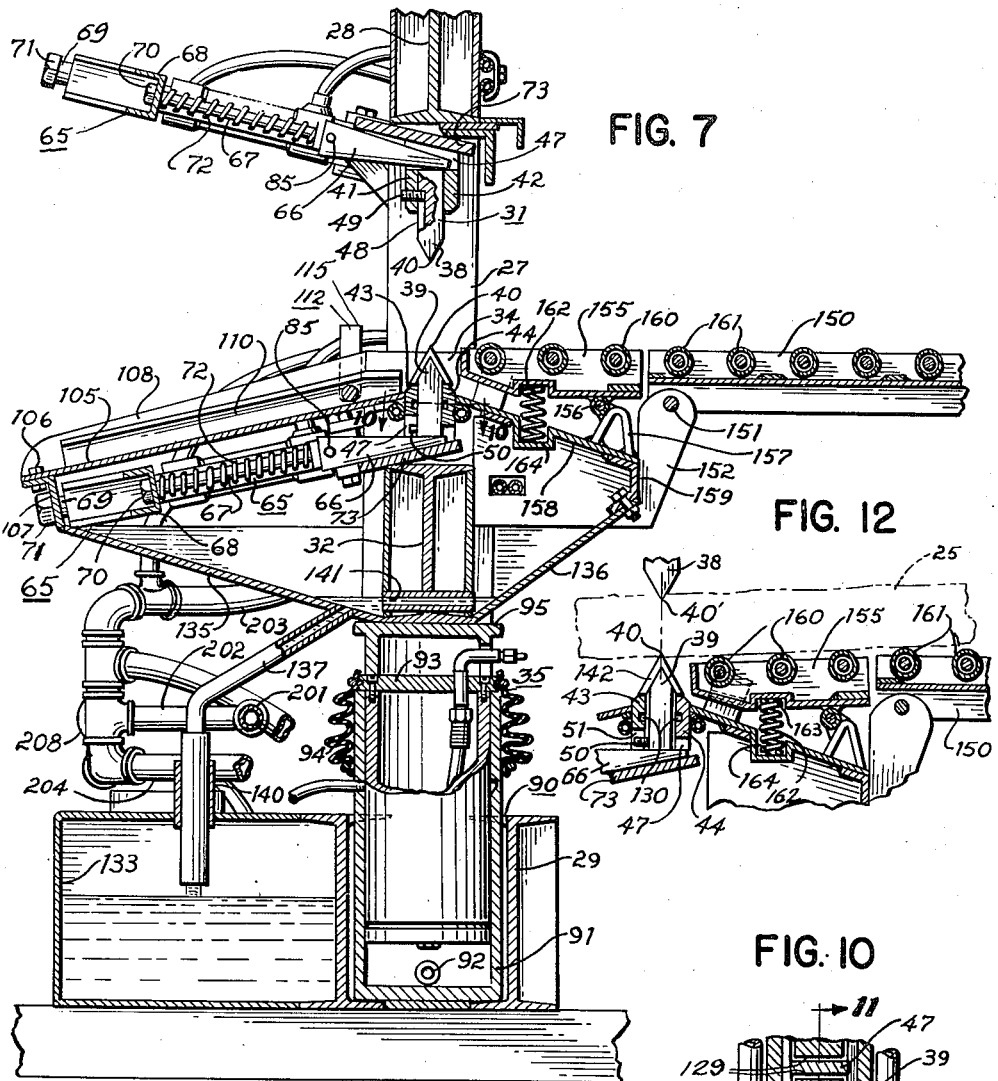
Fig. 7 is an enlarged vertical sectional view on substantially the line 7—7 of Fig. 1.
Fig. 10 is an enlarged horizontal sectional view on the line 10—10 of Fig. 7.
Fig. 11 is a view partly in elevation and partly in section on the line 11—11 of Fig. 10.
Fig. 12 is a sectional view of certain of the parts shown in section in Fig. 7, but showing different relative position of some of the parts as may be recognized by a comparison of the two figures.

As an aid for guiding the chisels 38 for vertical movement there are provided spaced apart front and rear chisel bars 41 and 42, respectively, welded or otherwise secured to the posts 27, and as an aid for guiding the chisels 39 for vertical movement, there are provided spaced apart front and rear chisel bars 43 and 44, respectively, welded or otherwise secured to sleeve-like end units 46 of the intermediate cross member 32 which loosely embrace the adjacent posts 27 as indicated in Fig. 6. Also as an aid for guiding the chisels in pairs, there are provided T-shaped chisel spacers 47 which may be welded or otherwise secured to their respective chisel bars 41, 42, 43 and 44. In order to prevent the chisels 38 from falling from their location below the cross bar 28, the shanks of the chisels are, in the example shown, each provided with a vertical groove 48 open to the face of the chisel shank confronting the front chisel bar 41 and closed to the top of the chisel shank, as shown in Fig. 7 into which groove the end of a movement limiting screw 49, freely extends, the screws for the various chisels 38 being carried by the chisel bar 41. In a similar manner the chisels 39 may be kept from being forced upwardly or picked out of proper relationship with the chisel bars 43 and 44, by providing each chisel with a movement limiting pin 50 extending from the face of its shank nearest the front chisel bar 43 this pin being accommodated in bottom opening notch 51 in the front chisel bar 43, for each pin 50, as shown in Figs. 11 and 12.

It is important that lower chisels 39 be aligned with the upper chisels 38 in order that the stone slab will be cut cleanly and so that it will not break into short lengths as it is cut. In Fig. 8 the chisels are, by dotted lines, shown in alignment and this results in perfect cutting of the stones, during operation of the machine. In dot-and-dash lines the chisel 39 is shown in an abnormal off-set relation to chisel 38. I provide means 53 carried by the movable intermediate cross member 32 at each of its sleeve-like end units 42 for adjusting and guiding the cross member 32 along the posts 27 in a path with the chisels 39 in alignment with the chisels 38. As a typical example of each means 53 I preferably make the posts 27 square or polygonal cross section, so as to have front and rear faces 54 which are vertical and parallel. I then provide in sliding engagement with each of the faces 54, a plate 55 held in adjusted positions by screws 56 extending through the adjacent wall of unit 46, the inner end of each screw being accommodated and revoluble in an unthreaded socket 57 in the plate as shown in Fig. 8. It is preferred to provide lock nuts 58 on the screws 56 so that after the latter have been manipulated to bring about the desired alignment, the nuts 58 may be turned tight against the outside of the unit 46 while holding the screws against turning movement. It is to be noted that the intermediate, elongated cross member 32 has some slight amplitude of movement in a longitudinal direction because the sleeve-like end units 46 loosely embrace the posts 27, spaces permitting this movement being indicated at 59 in Figs. 6 and 9. Thus the cross member 32 in addition to major movement in a vertical direction, responsive to the means 35, may also take a slight canted position, because of the spacing 59 and not subject the machine to destructive stresses and strains, if the stone slab being cut is thicker at one side than at the other and the chisels 38 and 39 are not properly set by the operator.

As means to assist in keeping the lower jaw of the machine (comprising the intermediate cross member 32 and parts carried thereby) from being elevated unevenly, I provide upright heavy coil tension springs 60 at each side of the machine, each spring having its upper end coupled, in any suitable manner, to an extension 61 of the adjacent sleeve-like end unit 46, and its lower end coupled, in any suitable manner, to a spring clip 63 which is rigid with the adjacent lower end of post 27.

Mechanism 65 is provided for each the upper set of chisels 38 disposed in side-by-side relationship and the lower set of chisels 39 also in side-by-side relationship, whereby the chisels are set in contact with the stone slab 25 according to the contours of the upper and lower faces thereof. This mechanism 65 is somewhat similar to that disclosed in the Johanning patent, in that each mechanism comprises a wedge 66 preferably for each chisel; a shank 67 for each wedge; a rack 68 for the shanks 67, slidable on guide rods 69 at opposite sides of the machine; a stop device 70 carried by each shank 67 at its end opposite that which supports its respective wedge 66 and located in a position to the outer side of the rack 68, as shown in Fig. 7; a stop device 71 carried by the rods 69 to limit movement of the rack 68; an expansion spring 72 about each shank 67 abutting against its respective wedge and against the rack 68, a wedge plate 73 for the wedges of each set of side-by-side chisels; and, means 75 for reciprocating the rack 68 on its guide rod 69 whereby the wedges are spring urged into imtimate contact with and between their respective chisels and the associated wedge plate 73, when the rack 68 is moved toward its associated chisels and whereby the wedges are uniformally retracted, when the rack 68 is moved away from its associated chisels. In stead of disposing the upper and lower mechanisms 65 with the wedge shanks associated with the upper and lower sets of chisels, parallel as in the Johanning Patent 2,152,193, I prefer to dispose this mechanism 65 so that the axes of the wedge shanks are in diverging relationship, as shown in Figs. 4 and 7 thus enabling workmen to better observe operation of the wedges and jaws. The means 75 may comprise two servo-motors, the cylinder 76 of each motor having conduits 77 and 78 in communication with opposite ends and the plunger 79 of each motor having pivotal connection, as at 80, with the adjacent end portion of the rack 68. In the example shown the cylinders 76 of mechanism 65, associated with the upper set of chisels 38 are pivotally connected, as at 82, with the posts 27; and the cylinders 76 of mechanism 65, associated with the lower set of chisels 39 are pivotally connected, as at 83, with the sleeve-like units 46 of the intermediate cross member 32.

I prefer to pivotally connect each wedge 66 to its respective shank 67 as by pivot bolt or pin 85, shown in Fig. 7 whereby the wedge is free to adjust itself for intimate surface-to-surface contact with its respective chisel and its companion wedge plate 73 without placing an undue strain upon its respective shank 67. In practice it has been found that if the wedge is rigidly secured to or formed integral with its respective shank, as in the Johanning Patent 2,152,193 the wedge is apt to "snap-off" its shank. This may be due to imperfections in manufacture or the great stresses and strains to which the machine is subjected when in use in cutting stone.

Figure 2:
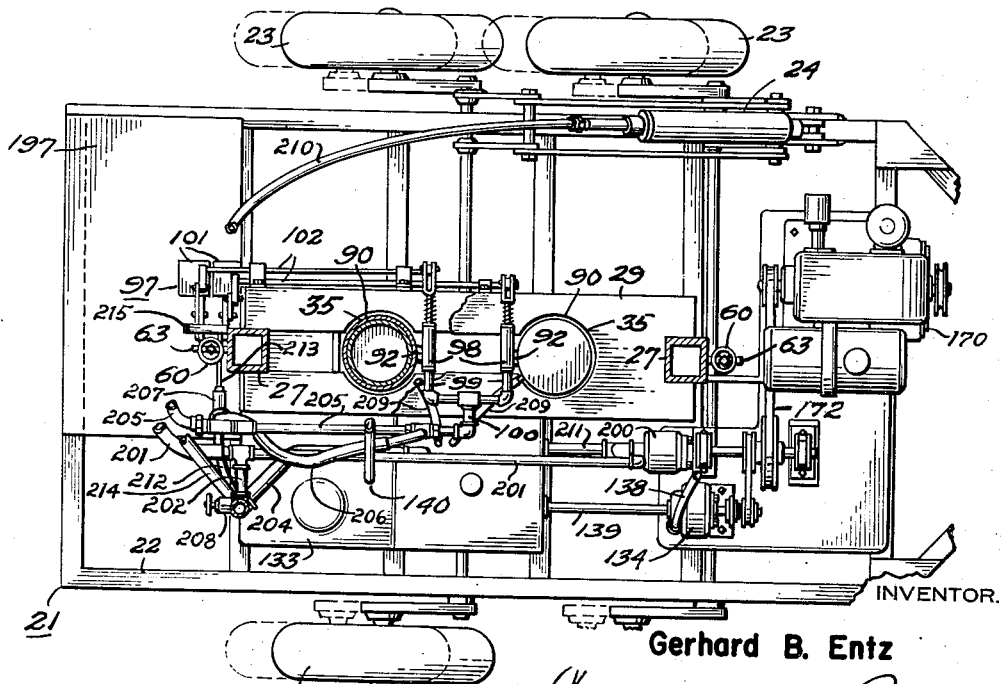
Fig. 2 is a horizontal, sectional view on substantially the line 2—2 of Fig. 1.

The means 35 cooperating with the lower reaction cross member 29 for actuating the intermediate cross member 32, in the example shown comprises a jack 90 carried by the member 29 adjacent each post 27 as shown in Figs. 1 and 2, and each jack 90 is preferably of the type shown in my copending application filed November 6, 1953, Serial No. 390,526, for power cylinders and pistons for hydraulic systems. Briefly each jack comprises a cylinder 91 having an entrance and exit conduit 92 operatively connected at its bottom; and, a piston 93 telescopically arranged with respect to the cylinder to be raised by fluid pressure in the cylinder and to descend when such pressure is relieved. In the example shown in Figs. 1 and 7 I disclose a dust excluding skirt 94 carried by the upper portion of the piston 93 and surrounding the upper portion of the cylinder. There is also disclosed a cap 95 interposed between the top of each piston 93 and the underside of cross member 32, which is used when relatively thin stone slabs are being cut, so as to bring the chisels 38 and 39 in closer spaced relationship when the top of piston 93 is resting on the top of cylinder 91, as shown in Fig. 7, but this cap 95 is dispensed with when thick stone is being cut, and under which condition, the cross member 32 rests directly and freely upon the top of piston 93. It is preferred to provide means 97 for selectively actuating the jacks 90 simultaneously or separately, whereby both jacks may be operated in unison when the stone slab to be cut extends to each side of the center between the two posts 27, as shown in Fig. 5, or to operate only one selected jack such as that beneath a smaller stone slab positioned between the machine jaws and which is nearer one post 27 than the other post. In practice, the workman feeding smaller stone slabs between the jaws may be located to the rear left side, or the rear right side of the machine, and thus this selection of operating one jack to the exclusion of the other, or with greater pressure in the cylinder of one than the other does not bring about a destructive or injurious canting of the cross member 32, when smaller stone slabs are being fed into the machine and operated upon by the jaws appreciably nearer to one post 27 than the other. The means 97 may comprise separate valves 98, normally biased to open position as shown in Fig. 13, connected by pipes 99 to a supply pipe 100 in which fluid under pressure may be delivered to the cylinders, through the valves, or pressure in the cylinders, relieved at the will of the operator. Each valve 98 is operatively connected to the conduit 92, of its respective cylinder. Each valve 98 may be actuated by its respective pedal 101, through motion transmitting means 102 of any suitable character.

As may be noted in Fig. 7 I prefer to have the lower mechanism 65 slant downwardly and forwardly from the zone of the machine jaws, toward the front of the machine, and to provide a slanting cover plate or slide 105 over the major working parts of the mechanism, and particularly the wedge shanks 67, racks 68 and springs 72. The lower marginal portion of this plate or slide 105 may be secured by bolts 106 to one leg of an angle iron 107 extending across the machine and carried by the free ends of the guide rods 69, and the upper marginal portion may rest upon the front chisel bar 43. The sides of the plate or slide 105 may be turned upwardly and outwardly, as at 108, so that the sides diverge upwardly and outwardly as indicated in Fig. 1. Instead of having the wanted pieces which are cut from the stone slab, slide upon the plate 105, I prefer to provide a plurality of parallel rails 110 mounted upon the plate, extending from adjacent the zone of the machine jaws, downwardly and outwardly as indicated in Figs. 6 and 7. This arrangement enables workmen to more readily grasp the cut strip or piece of stone severed from the stone slab and place it for packaging, storage or shipment. Also any small pieces of stone which may break from the slab and any sand, dirt or other unwanted material which adhered to the slab up to the time of its being operated by the machine, and dropping off upon the plate 105, will drop between the rails 110 and slide away in separated relationship with the wanted stone pieces.

I also preferably provide a gage device 112, in the example shown, carried by and movable with the lower jaw of the machine and located at the front side of the machine, to facilitate arranging or stopping the stone slab in a position with respect to the jaws of the machine for cutting a piece or strip from the slab of the desired width, such as four inches wide, by way of example. The gage device may comprise a transverse shaft 114 journaled in the rails 110 and provided with one or more radially extending stop elements 115. Means 116, preferably operated hydraulically, is provided for oscillating the shaft 114, so as to dispose the stop elements 115 projecting upwardly in the path of movement of the stone slab, in one position, and to dispose the stop elements 115 lying wholly between the rails 110 in an inactive position. The means 116 may comprise a crank 117 on one end of shaft 114 and a servo-motor 118 for the crank, the plunger 119 of the motor being operatively connected with its crank 117 and the cylinder 120 of the motor being pivoted, as at 121 to the adjacent sleeve-like unit 46. The cylinder 120 is provided with conduits 123 and 124 in communication with opposite ends of the cylinder. As hereinafter brought out, it is preferred to provide a single control 220, manually operable, whereby fluid under pressure will be delivered to the servo-motors of means 75 for setting the chisels 38 and 39 in fixed, contacting relation to the contour of the stone slab at the zone where it is to be cut and simultaneously to the servo-motor associated with the gage device 112 to move the stop elements 115 to inactive position, and vice versa.

I have found that in practice, it is most desirable to copiously lubricate the shanks of the lower set of chisels 39 and the wedges 66 associated therewith and to wash away therefrom, unwanted material such as small stone fragments, sand, dirt, etc. With this in view I prefer to provide slight spaces 128 between the shanks of the chisels and the chisel bars 43 and 44, and slight spaces 129 between the chisel shanks and the chisel spacers 47, as shown greatly exaggerated in Figs. 10 and 11; to provide longitudinally extending grooves 130 in the inner faces of the chisel bars 43 and 44 as shown in Figs. 10 and 12; and manifolds 131, which through laterals 132 deliver a cleansing lubricant, such as kerosene from a settling tank 133, through a pump 134 (shown in Fig. 13).

and conduit 138 to the grooves 130. In order to retrieve the cleansing lubricant which flows downwardly upon the shanks of the chisels 39, the wedges 66, the wedge plate 73 associated therewith, and other parts of the mechanism subjacent thereto, I equip the machine with sump plates 135 and 136, shown in Fig. 7 at each side cross member 32 and carried thereby to convey the cleansing lubricant through a conduit 137 open to the lower portion of plate 135 to the settling tank 133 from which the pump 134 draws its supply of cleansing lubricant through intake pipe 139. Since the conduit 137 moves upwardly and downwardly with the cross member 32 during operation of the machine, the lower portion of the conduit is telescopically arranged to extend vertically through an upright sleeve 140 extending through and carried by the top of tank 133. A horizontal cross conduit 141 extends through the member 32 so that cleansing lubricant flowing down the plate 136 may find its way through the conduit 141 to the zone of conduit 137 and back to tank 133.

It has been found unnecessary to provide this type of lubricant for the upper chisels 38 and associated wedges, and in fact detrimental since the stone cut by the machine is of less value if stained by a lubricant. As an extra precaution against cleansing lubricant finding its way to a zone where it would otherwise likely stain the stone, I prefer to provide each of the lower chisels 39 with an arrow-like head which provides eave-like projections 142 laterally of opposite sides of its shank and gable projections 143 to one side of the shank, as shown in Fig. 11, which overlie the chisel spacers 47, thus providing a substantially continuous guarded cutting edge paralleling and located above the cross member 32. Unwanted material carried by the cleansing lubricant settles in the tank 133 and may be removed therefrom occasionally.

Associated with the lower or movable jaw of the machine, is a conveyor or roller-way upon which the stone slabs are moved. This preferably includes a relatively long, major section 150 one end portion of which, adjacent the machine, is pivoted thereto, as by pivot 151 and bracket means 152 rigid with the cross member 32, and the other end portion of which, remote from the machine, is supported on leg means 153, as shown in Fig. 4. This roller-way or conveyor also preferably includes a minor section 155 substantially bridging the space between the major section 150 and the zone of the chisels 39, as shown in Figs. 7 and 12. The minor section 155 has its rear end, adjacent to section 150 pivoted, as by pin 156 to a bracket 157 which in turn is secured to an apron 158 carried by the cross member 32 and extending downwardly and rearwardly from the chisel bar 44 to a transverse channel bar 159. The minor section 155 of the roller-way has the uppermost portions of its parallel, transverse rollers 160 normally maintained in the same horizontal plane as the uppermost portions of parallel, transverse rollers 161 carried by the major section 150, as shown in Fig. 7. This normal positioning of the minor portion is accomplished by the use of an expansion spring 162 having its upper end portion engaging in a socket 163 open at the bottom of the minor section, and its lower end portion engaging in a socket 164 in the apron 158 open to its upper portion. The spring 162 is of a strength to sustain the load coming upon it, such as the stone slab of the largest size capable of being operated upon by the machine, and with the uppermost portions of the rollers 160 in a plane above the cutting edges 40 of the chisels 39. Thus a stone slab may be moved along the roller-way section 150 to a position partly or wholly supported by the minor section 155 where a portion of the slab extends between the jaws of the machine and its forward movement is stopped by the gage device 112. When so positioned, the operator through the means 35 may bodily lift the slab by upward movement of the lower jaw until the upper surface of the slab, even though uneven, will contact the various superjacent chisels 38. This is then usually followed by setting the chisels by the mechanisms 65. The final step in cycle operation of cutting the slab is to then again use the means 35 to further exert a lifting action with respect to the cross member 32 and thus sever a piece from the slab. If, however, the operator does not properly set the lower chisels 40 in firm engagement with the underside of the slab before this final severing step, upon exerting this final lifting action, the minor section 155 of the roller-way will yield, as shown in Fig. 12 and not subject the machine to destructive stresses and strains because of such abnormal operation.

In other words, in this abnormal operation, the spring 162 yields to permit tilting of the minor section 155, and a strip is cut from the slab, substantially as good in appearance as if the machine had been operated in a normal manner, and without likelihood of any breakage or twisting of parts of the machine out of shape.

Figure 15:
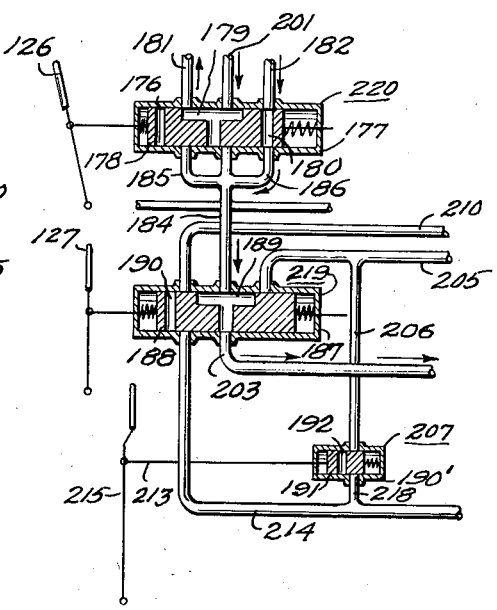
Figure 16:
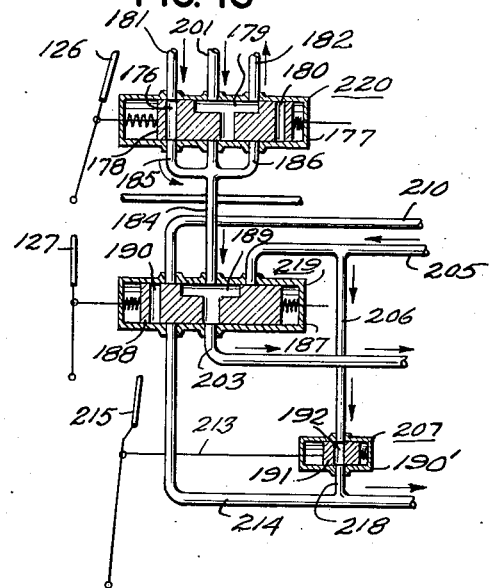

As a typical layout of mechanism for supplying fluid under pressure to and from the various jacks 90 and servo-motors, and for controlling the flow thereof, reference may be had more particularly to Figs. 1, 2, 3, 4 and 13 where a prime mover 170, such as a gasoline engine, operates a pump 200, through suitable motion transmitting means 172. The intake 211 of the pump has communication with the interior of a supply tank 174 for motive fluid 175. The outlet of the pump pressurizes a line 201 to the control for the means 75 (chisel setting mechanism 65) and means 116 (for operating the gage device 112). With the control 220 in the position shown in Fig. 15, fluid under pressure is delivered through lines 77 to force the wedges 66 to chisel setting positions as previously described, and at the same time fluid under pressure is delivered through lines 123 to retract the gage elements 115 to inactive positions. With the control 220 in the opposite position, as shown in Fig. 16, lines 78 are pressurized to withdraw the wedges 66, and line 124 is pressurized to bring the elements 115 to active positions.

Figure 14:
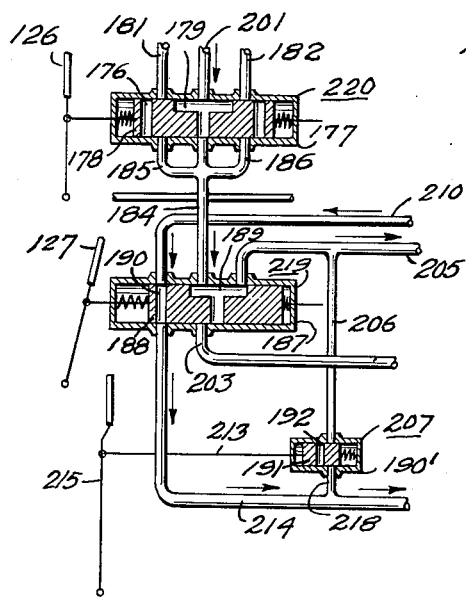
Figs. 14, 15 and 16 are fragmentary schematic fluid flow diagrams showing certain of the controls shown in Fig. 13 in different positions during a cycle of operation of the machine.
Figure 17:
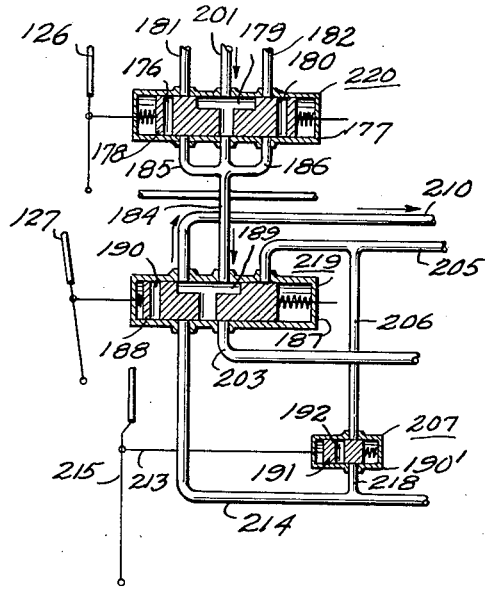
Fig. 17 is a fragmentary schematic fluid flow diagram, similar to Figs. 14, 15 and 16, showing one of the controls in position for operating accessories which may be associated with the machine.

The control 220 preferably comprises an elongated housing 177 in which a reciprocable valve 178 is normally spring biased to a central neutral position, as shown in Figs. 13, 14 and 17. The valve has a central T-shaped transverse port 179 the head of which is always in communication with the pressurized line 201, open to the central portion of the housing; and transverse ports 176 and 180 at opposite sides of port 179 which may be selectively brought in communication with manifolds 181 and 182, respectively, when the valve is moved one way or the other from neutral position. The valve 178 may be operated from a neutral position by means of a hand lever 126. The manifold 181 connects with conduits 77 and 123, while manifold 182 connects with conduits 78 and 124. The housing 177 has a centrally located conduit 184 which communicates with a control 219 hereinafter described, and two branch exhaust conduits 185 and 186 aligned with manifolds 181 and 182, respectively. When the lever 126 is pulled toward the operator, as shown in Fig. 15, port 179 delivers fluid under pressure to manifold 181 and port 180 communicates with manifold 182 to permit exhaust of fluid under pressure from the inactive ends of the servo-motor cylinders 76 and 120 through the conduit 186. At the same time, the stem portion of port 179 is moved out of communication with conduit 184. If control lever 126 is moved away from the operator, past neutral position, as shown in Fig. 16, the head of port 179 delivers fluid under pressure from conduit 201 to manifold 182 retracting the wedges 66, and setting gages 115; fluid under pressure is cut off from conduit 184; and port 176 permits exhaust of fluid from the inactive ends of servo-motor cylinders 76 and 120 through branch conduit 185.

The control 219 is provided for raising the pistons 93 with respect to the cylinders 91 and thereby raising the lower jaw of the machine, and may also serve to operate accessories, such as to raise a turntable 300 indicated in Fig. 13 as provided with a hydraulic jack 301, but which forms no part of the present invention, or for operating the means 24, herein referred to, for raising and lowering the machine frame 22 with respect to the ground wheels 23, the means 24 being herein shown as including a hydraulic cylinder 302 and cooperating piston 303 disclosed in my aforesaid application Serial No. 389,753. This control 219 comprises an elongated housing 187 in which a reciprocable valve 188 is normally spring biased to a central neutral position. The housing 187 has a central connection with the conduit 184 and a diametrically opposite outlet conduit 203. The valve 188 has a central T-shaped transverse port 189, the head of which is always in communication with conduit 184, and when the valve is in a neutral position, also in communication with conduit 203, as shown in Figs. 13, 15 and 17. The housing 187 also has a conduit 205 to one side of conduit 184 which affords communication between the housing 187 and the supply pipe 100. The valve 188 may be operated from a neutral position by means of a hand lever 127, so that if this lever is pushed away from the operator, to the position shown in Fig. 14, fluid will be delivered to both cylinders 91 for lifting the pistons 93, if both valves 98 are open, or to the selected cylinder, if one of the valves 98 is closed.

The housing 187 of control 219 is also shown provided with a conduit 210 spaced from the conduit 184 to the side opposite from conduit 205, which may be selectively connected with the hydraulic jack 301 as shown in full lines, or connected with hydraulic cylinder 302, as shown by dash lines in Fig. 13. Thus when the control lever 127 is pulled toward the operator, as shown in Fig. 17 fluid under pressure is delivered to the conduit 210 for raising the turntable, or for lifting the machine frame with respect to the ground wheels 23 of the trailer, as the case may be. The valve 188 is also provided with a transverse port 190 which may be, by operation of hand lever 127, brought into communication with conduit 210 and with a conduit 214 which joins with a conduit 204 exhausting into the tank 174. In this manner, if the hand lever 127 is pushed away from the operator as shown in Fig. 14, the jack 301 or the cylinder 302 may be relieved of pressure, for lowering the turntable. When the machine is in use, the conduit 210 is not connected to the cylinder 302, and it is only when it is desired to move the machine from one place to another, on its trailer, that connection of conduit 210 with cylinder 302 is made.

For the purpose of lowering the pistons 93 with respect to the cylinders 91, a control 207 is provided, comprising a housing 190′, having a relief line 206 at one side communicating with conduit 205 and a relief line 218 at the other side of the housing in communication with conduits 204 and 214; and a valve 191, having a transverse port 192 which may be brought into communicatoin with lines 206 and 218, but which is normally spring biased to a closed or non-communicating position. A hand lever 215 is provided, operatively connected with valve 191 by rod 213 for moving the valve to the position shown in Fig. 16 for relieving pressure in the cylinders 91. This control 207 may also be used to prevent operation of the jacks 90 when it is desired to relieve pressure in the jack 301 or in the cylinder 302 as may be observed by an inspection of Fig. 14 and with the assumption that control 207 is also operated to bring port 192 in alignment with relief lines 206 and 218.

An adjustable pressure regulator 208 is provided in association with conduits 201 and 204 whereby the system is relieved of shock if the controls, or some of them are not in neutral positions, that is, in position where the fluid may be circulated from tank 174, through pump 200, line 201, control 220, conduit 184, control 219, and conduits 203 and 204 back to tank 174. This control 208 comprises an elongated casing 193 with a relief line 202 connected to conduit 201 communicating with the end of the casing in which is provided a spring urged valve 194 normally seated to close relief line 202 but yieldable to open at a predetermined pressure. The conduit 203 connects with one side of casing 193 as shown in Fig. 13, beyond valve 194, and a conduit 195 connects the other side of the casing, beyond valve 194 with conduit 204. Thus, while the fluid delivered from the outlet of pump 200 is not being used to operate some of the parts of the machine for stone cutting purposes, or for operating any accessories associated therewith, the fluid may circulate from the pump 200 through conduits 201, and 202, regulator 208 and conduits 194 and 204 back to the tank 174. The pump 200 may be of a capacity to more than supply the fluid under pressure necessary for operation of any of the mechanisms of the machine, and for raising the machine with respect to the ground wheels 23 and any excess in pressure not needed will result in the fluid opening valve 194 for circulation of some of the fluid as described.

I have found it desirable to provide relief valves 216 and 217, preferably of adjustable type, associated with the manifolds 181 and 182 respectively, as shown in Fig. 13, these relief valves having conduits 195 which join in a single conduit 196, joining conduit 203. By this arrangement, if the operator manipulates the control 220 from a neutral position for a period of time longer than necessary to operate the servo-motors associated therewith for performing the functions of such motors, the conduits associated with these manifolds will not be ruptured by the high pressure of the hydraulic fluid, since relief is had through the associated relief valves 216 or 217 through the conduits 195 and finally back to tank 174.

In Fig. 13 are shown pipes 209 leading from the upper end portions of cylinders 91 to the interior of tank 133. These are for the purpose of conserving the hydraulic fluid which may find its way along the outside of the pistons 93 and the interior of the cylinders 91. This arrangement forms no part of the present invention and is disclosed and claimed in my copending application for patent relating to power cylinders and pistons for hydraulic systems, filed November 6, 1953, Serial No. 390,526.

Figure 3:
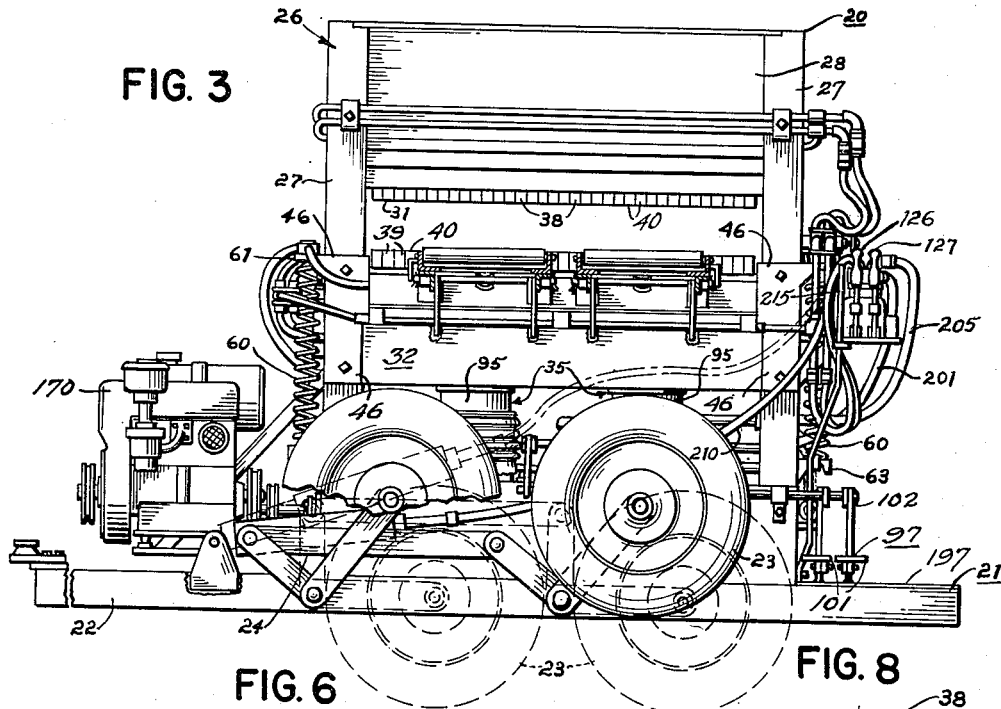
Fig. 3 is a rear elevational view of the machine mounted on the trailer.

The operation of the machine would seem to be obvious, but, in the interest of clearness, it may be said that in the use of the invention illustrated, the hand control levers 126, 127, and 215, are preferably located in close proximity to one another, as shown in Fig. 3, in a position to be conveniently manipulated by an operator standing on a platform 197. The foot pedals 101 are also located below the zone of the hand control levers, and in such proximity to the platform that the same operator may conveniently step upon either pedal and force it downwardly when it is desired to close either valve 98 thereby cutting off delivery of hydraulic fluid to the particular jack not wanted in operation as when cutting a piece of stone which is mainly to one side of the center of the machine than the other side thereof, instead of being large, extending across most of the chisels 38 and 40 as shown in Fig. 5.

The preferred sequence of manipulation of the levers 126, 127 and 215 is as follows:

Assuming that the various controls are in neutral positions, as shown in Fig. 13, the jaws of the machine are open and the gage stop elements 115 are up in position to prevent free passage of the stone entirely through the machine, an attendant passes a piece of stone along the sections 150 and 155 of the roller-way shown in Fig. 7, until a selected edge of the stone engages the stop elements 115. The operator then operates lever 127 to cause lifting of the lower jaw, including the roller-way section 155 and the adjacent portion of section 150, as well as the stone, until the stone has partially lifted the upper chisels 38 and have adjusted themselves to the contour of the upper face of the stone, along the line of their cutting edges 40. The lever 127 is then manipulated or allowed to assume a position where the control 219 is in neutral condition. This results in the lower jaw remaining in the thus elevated position, by hydraulic fluid trapped under the pistons 93 in cylinders 91.

The operator then manipulates lever 126 to dispose the associated valve 178 in the position shown in Fig. 15 and to bring about lowering of the gage elements 115 and simultaneously setting the wedges 66 of each the upper and lower jaws, so that their respective chisels have their cutting edges in intimate contact with the upper and lower faces of the stone, as shown in Fig. 5. If the operator holds lever 126 in the position shown in Fig. 15 longer than necessary to accomplish this, excessive pressure in the conduits 77 and 123 is relieved through relief valve 216.

If the operator attempts to raise the lower jaw, by manipulation of lever 127, while holding the lever 126 in a position to set the wedges and lower the stop elements 115, the valve 178 will be in the position shown in Fig. 15 cutting off communication with the conduit 184. Thus no fluid under pressure, sufficient to operate the jacks 91, would be available at the control 219, for raising the lower jaw. This is a safety measure embodied in the machine to permit effective operation of control 219 only when the valve 178 of control 220 is in a neutral position.

If a wide stone is between the jaws of the machine, neither foot pedal 101 is operated, but if a narrow stone has been fed between the jaws and it is to the side nearest the operator, then the foot pedal 101 to the right in Fig. 2 is depressed, closing the valve 98 associated with the jack 90 remote from the operator, so it will not be further operated during the cutting operation of the machine, and thus not subject the lower jaw to a forceful canted position, otherwise likely to injure the machine. If a narrow stone is in the machine toward the other side of the machine, remote from the operator, the other foot pedal 101 is depressed with corresponding result.

The next procedure is to manipulate hand lever 127 to position the valve of control 219 as shown in Fig. 14, to further lift the lower jaw, associated parts and the stone, which brings about a cutting of the latter along the cutting edges 40 of the chisels. The gaged piece of cut stone is grasped by an assistant who may slide it along the rails 110 and remove it from the zone of the machine.

Upon cutting of the stone, the operator permits control 219 to assume neutral condition by releasing hold on lever 127 and may then simultaneously push on levers 126 and 215 to position the valves of controls 220 and 207 as shown in Fig. 16. This results in withdrawal of the wedges 66 from setting position, raising of the gage elements 115 and lowering of the lower jaw. The upper chisels 38 and lower chisels 39 lower by gravity to the position shown in Fig. 7 in readiness for the next cycle of operation.

If a careless operator happens to manipulate the lever 127 for final cutting of the stone, before the wedges have been fully set, the section 155 of the roller-way will yield, due to the spring mounting 162 and not subject the machine to destructive stresses and strains.

Between cycles of operation of the machine the prime mover 170 may continue to operate the pump 200 with mere circulation of the hydraulic fluid through the various controls 220 and 219, as previously described.

While the invention herein disclosed is particularly well adapted for use in cutting natural or quarry stone, where the upper and/or lower faces of the pieces or slabs may be noticeably uneven, it, or some of the subcombinations of it, are of course applicable to the cutting of artificial stone, or concrete slabs or blocks.

I claim:

1. In a stone cutting machine, the combination of an upright frame comprising spaced parallel posts and upper and lower elongated reaction cross members rigidly connected with the upper and lower portions, respectively, of said posts; a first cutting means carried by and disposed longitudinally of said upper cross member for engagement upon the upper surface of the stone to be cut along a predetermined line of fracture; an intermediate elongated cross member disposed with its end portions guided by said posts for slight longitudinal movement and for movement toward and from said upper and lower reaction cross members; a second cutting means disposed longitudinally of the said intermediate cross member for engagement with the under surface of the stone to be cut along said predetermined line of fracture; two jacks carried by said lower reaction cross member, one adjacent one of said posts, and the other adjacent the other said posts, said jacks each operatively engaging its adjacent end portion of said intermediate cross member to raise and lower same; and means for selectively actuating said jacks simultaneously or separately to move said intermediate cross member toward said upper reaction member, whereby both of said jacks may be operated simultaneously to cut a large stone located between said first and second cutting means and to each side of the center between said posts, and whereby a selected one of the jacks may be operated to cut a small stone located between said first and second cutting means and in a zone nearer one post than the other.

2. The machine combination of claim 1 in which said jacks are hydraulically operated and said last mentioned means comprises a source of fluid under pressure, a first fluid conduit leading from said source, a first control valve in said conduit, two branch conduits leading from said first conduit, one to each of said hydraulically operated jacks, and a branch control valve in each of said branch conduits.

3. The machine combination of claim 2 in which said first control valve is normally biased to a closed position, and said branch valves normally biased to an open position whereby one of said jacks may be operated to the exclusion of the other by closing one of said branch valves and opening said first valve.

4. In a stone cutting machine of the class wherein an upper jaw and a lower jaw is provided between which the stone to be cut is moved and disposed, said jaws including means provided with cutting edges in confronting relationship, and in substantially the same plane, for engagement with the top and bottom faces of the stone, the said means of at least one of said jaws including a plurality of independently movable chisels in side-by-side relationship, providing the said cutting edges of said jaw, and a first hydraulically operated mechanism for setting said chisels, in contact with the stone according to the contour of the face of the stone adjacent thereto or freeing the chisels for independent movement, and vice versa; the combination of a gage device carried by the machine including at least one movable stop element disposed to one side of said plane and a second hydraulically operated mechanism carried by the machine for moving said stop element into and out of the path of movement of the stone; and a control means for said first and second hydraulically operated mechanism constructed and arranged to actuate said second hydraulically operated mechanism to move said stop element out of the path of movement of the stone and to simultaneously actuate said first hydraulically operated mechanism to set said chisels against the stone, and vice versa.

5. The machine combination of claim 4 in which said lower jaw is movable toward said upper jaw for cutting the stone and said gage device is carried by said lower jaw.

6. In a stone cutting machine the combination of an upright frame comprising spaced parallel posts, each having opposite flat parallel front and rear faces, and upper and lower elongated reaction cross members rigidly connected with the upper and lower portions, respectively, of said posts; a first cutting means carried by and disposed longitudinally of said upper cross member for engagement upon the upper surface of the stone to be cut along a predetermined line of fracture; an intermediate elongated cross member disposed with its end portions in loosely spaced embracing relation to said posts, for movement toward and from said upper and lower reaction members; a second cutting means carried by and disposed longitudinally of said intermediate cross member for engagement with the under surface of the stone to be cut; adjustable means carried by said intermediate cross member, at each of its said end portions and cooperating with said posts for guiding said intermediate cross member in a path of movement with said second cutting means in alignment with said first cutting means, each of said adjusting means comprising opposite plates in sliding engagement with said oposite faces of its respective post, and screws carried by said intermediate member engaging said plates and disposed with their axes normal to said plates; and means between said lower reaction and intermediate cross members for actuating the latter.

7. In a stone cutting machine, the combination of an upper jaw and a lower jaw between which the stone to be cut is moved and disposed, said jaws including means provided with cutting edges in confronting relationship, and in substantially the same vertical plane, for engagement with the top and bottom faces of the stone, the said means of said lower jaw including a plurality of independently movable chisels, in side-by-side relationship and including shanks and heads on the shanks providing the said cutting edges of said lower jaw, and means for delivering a lubricating-wash liquid to the shanks of said chisels for carrying away foreign matter from the chisels by gravity flow of the liquid.

8. In a stone cutting machine of the class in which a pair of relatively movable upper and lower jaws is provided between which the stone, moved from an entrance side of the machine, is disposed for cutting same, and from the discharge side of which the cut stone is removed; the improvement which comprises, a plate, at the discharge side of the machine, extending outwardly in a downward direction from the zone of said lower jaw upon which broken fragments and other refuse incident to cutting of the stone moves by gravity away from the machine, and a plurality of laterally spaced rails above said plate and slanting, in the same general direction as the plate, from the zone of said lower jaw, upon which the stone cut by operation of the machine may be moved by the workman by sliding same upon said rails.

9. In a stone cutting machine as set forth in claim 8 in which a gage is movably supported by said rails and includes a plurality of stop elements which in one position lie wholly beneath the treads of said rails, and in another position extend upwardly in the path of the stone while moving in a direction from the entrance side of the machine, between the jaws and beyond the discharge side of the machine.

10. In a cutting jaw for a stone cutting machine, the combination of a plurality of chisels, each comprising a shank having a transverse cutting edge at one end and a gable-like projection extending from a side of the shank provided with a cutting edge in continuation with said first mentioned cutting edge, and means movably supporting said chisels in side-by-side relationship; with the cutting edges of the shanks and of the projections normally in the same line, but for movement axially independently one with respect to another whereby they may be independently moved to dispose their said cutting edges into intimate contact with the uneven surface of a stone, said means including spacers between said sides of adjacent chisels from which said projections extend.

11. The cutting jaw as specified in claim 10 in which said chisels are arranged in pairs, the chisels of each pair disposed with the sides of their shanks, opposite to those from which said projections extend, in sliding contact one with another.

12. In a stone cutting machine of the type in which independently movable chisels, of a jaw of the machine, are set with their cutting edges in intimate contact with an uneven face of a stone to be cut, by the driven action of a wedge provided for each chisel; the improvement which comprises, a shank associated with each wedge, a pivotal connection between one end of each shank and the driving end of its respective wedge, first means associated with the other ends of said shanks movable in one direction for simultaneously retracting the wedges from positions setting said chisels and second means associated with each of said wedges and said first means for independently biasing said wedges to chisel setting positions when said first means is moved in a direction opposite to said first mentioned direction.

13. In a stone cutting machine of the type in which independently movable chisels of a jaw of the machine are set with their cutting edges in intimate contact with a face of the stone to be cut by the driven action of a movable wedge provided for each chisel, the improvement which comprises a cylinder and a piston therein; means operatively connecting said piston with said wedges for setting them when the stroke of the piston is in a first direction in its cylinder, and for retracting the wedges when the stroke of the piston is in a second opposite direction in its cylinders; means supplying fluid under pressure, including a supply reservoir for the fluid and a pump deriving its charge of fluid from said reservoir; a control device, including a three-way valve; a first conduit conveying fluid under pressure from said pump to said control device; a second conduit connected with said control device and with one end of said cylinder for conveying fluid under pressure from the control device to said cylinder when said valve is in a first position to move said piston in said first direction, and to convey fluid from the cylinder to said control device when said valve is in a second position; a third conduit connected with said control device and with the other end of said cylinder for conveying fluid under pressure thereto when said valve is in said second position to move said piston in said second direction, and to convey fluid from the cylinder to said control device when said valve is in said first position; a first relief valve associated with said second conduit, constructed and arranged to permit escape of fluid under pressure therefrom when said piston has reached the end of its stroke in said first direction and said valve is in said first position; a second relief valve associated with said third conduit, constructed and arranged to permit escape of fluid under pressure therefrom when said piston has reached the end of its stroke in said second direction and said valve is in said second position; and conduit means for conveying fluid from said first and second relief valves to said reservoir.

14. In a stone cutting machine of the type in which two jaws are provided between which the stone to be cut is disposed and at least one of which jaws is provided with independently movable chisels set with their cutting edges in intimate contact with a face of the stone, by the driven action of a movable wedge provided for each chisel, the improvement which comprises, means for supplying hydraulic fluid under pressure, including a supply reservoir for the fluid and a pump deriving its charge of fluid from said reservoir; a first hydraulically operated means operatively connected with said wedges for setting and retracting the same; a first control device for said first hydraulically operated means, including a valve which is movable from a neutral position to a transfer position; a first conduit means for conducting hydraulic fluid from said pump to and through said first control device only when its said valve is in a neutral position, and to said first hydraulically operated means when said valve is in said transfer position for operation of the latter; a second hydraulically operated means for moving at least one of said jaws toward the other jaw for cutting of the stone; a second control device for said second hydraulically operated means, including a valve which is movable from a neutral position to transfer position; a second conduit means connecting said first and second control devices for delivery of hydraulic fluid from the former, when its valve is in a neutral position, to and through said second control device only when the valve of the latter is in a neutral position; a third conduit means connecting said second control device for conducting hydraulic fluid from said second control device to said second hydraulically operated means when the valve of the former is in said transfer position; and a fourth conduit means for conducting hydraulic fluid from said second control device to said reservoir for recirculation when the valves of both said first and second control devices are in neutral positions, and whereby said second control device cannot be operated to deliver hydraulic fluid to said second hydraulically operated means, for said movement of its respective jaw, unless said valve of said first control device is in a neutral position.

References Cited in the file of this patent

UNITED STATES PATENTS

| | | |
|---|---|---|
| 2,188,318 | Siderits | Jan. 30, 1940 |
| 2,368,138 | Hayden | Jan. 30, 1945 |
| 2,452,706 | White | Nov. 2, 1948 |
| 2,514,352 | Solomito | July 4, 1950 |
| 2,550,937 | Pye | May 1, 1951 |
| 2,552,958 | Graham | May 15, 1951 |
| 2,657,681 | Gatzke | Nov. 3, 1953 |